Oct. 28, 1958   T. G. BANK   2,858,486
SHADING COIL AND GUIDE BEARING
Filed Feb. 12, 1954

Inventor
Thor G. Bank
by Egon W. Mueller
Attorney

United States Patent Office
2,858,486
Patented Oct. 28, 1958

2,858,486

SHADING COIL AND GUIDE BEARING

Thor G. Bank, Wauwatosa, Wis., assignor to Allis-Chalmers Manufacturing Company, Milwaukee, Wis.

Application February 12, 1954, Serial No. 409,874

6 Claims. (Cl. 317—180)

This invention relates to alternating current electromagnets and more particularly to a shading coil utilized therewith, wherein the shading coil performs also a bearing function as a guide bearing for the reciprocable armature of the electromagnet.

The prior art devices teach the utilization of an alternating current electromagnet with a shading coil provided to damp alternating current oscillations. However, the prior art has always provided, where necessary, additional guiding or bearing surfaces to journal the armature in its upward and downward movements as the electromagnet is energized and deenergized. The prior art devices therefore necessitated both shading coil structures and guiding or bearing structures.

This invention has eliminated the need for additional bearing or guiding structures in electromagnets utilizing a shading coil.

Accordingly, it is an object of this invention to provide an alternating current electromagnet wherein the shading coil is placed adjacent the movable armature to damp ing current oscillations between the armature and the core assembly, and to provide bearing surfaces to the reciprocating armature.

Another object of this invention is to provide an easily assembled and inexpensive shading coil presenting bearing surfaces for journaling the armature.

Another object of the invention is to provide a ruggedly constructed shading coil and guide bearing surfaces which will function with minimal maintenance.

Other objects and advantages will appear from the following description of the structure illustrated in the embodiment of the invention, reference being had to the accompanying drawings, in which.

Figure 1:
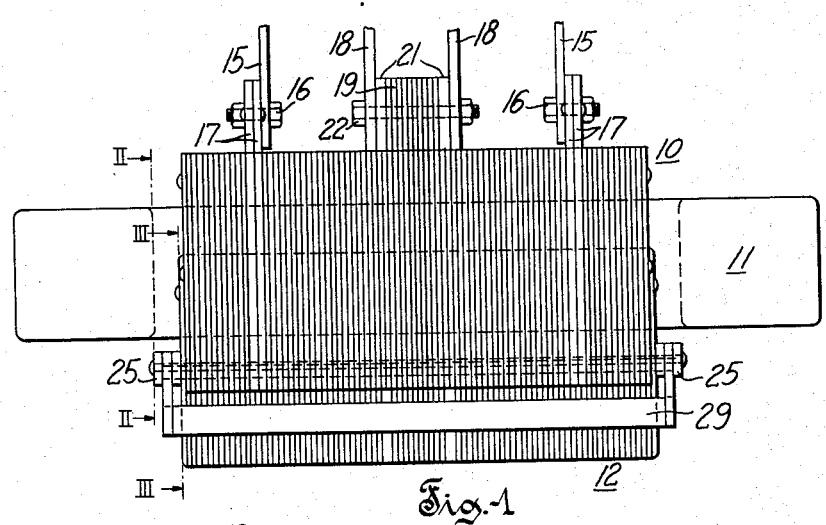
Fig. 1 is an elevational view of an alternating current electromagnet embodying the invention.

Fig. 1 is illustrative of an embodiment of the invention wherein a laminated core assembly 10 is shown with a coil assembly 11 carried by and inductively coupled with core assembly 10.

An armature 12 is reciprocatingly disposed adjacent core assembly 10 and is adapted to be magnetically actuated by combined action of core and coil assemblies 10 and 11. The armature 12 may be of a laminated construction. The armature 12 may be any desired length as respects the length of the core assembly 10 and is shown in the embodiment as extending the full length of core assembly 10. Core assembly 10 may be suspended by any known construction and is shown being suspended by hangers 15 connected by bolts 16 to a pair of oversized laminations 17 incorporated into the laminations of core assembly 10.

Figure 2:
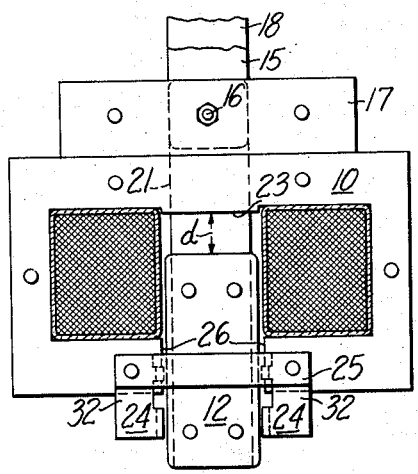
Fig. 2 is a view taken on line II—II of Fig. 1 illustrating an end view embodying the invention.

Armature 12 in a deenergized condition is suspended in core assembly 10 by plunger arms 18 which bear against core assembly 10. Plunger arms 18 are separated by a spacer 19, and connected to armature portions 21 by bolt 22. The armature 12 has a normal distance of travel from a deenergized to an energized position shown as (d) in Fig. 2. The upward movement of armature 12 to the energized position is limited by surface 23 of core assembly 10. Armature portions 21 project through and beyond the lamination of core assembly 10. Core assembly 10 therefore provides guidance for armature portions 21 as armature 12 traverses its upward and downward movement within core assembly 10. Core assembly 10 may be further described as C-shaped with presenting ends 26 at the termini of the C. Armature 12 is disposed to move upward and downward intermediate the ends 26 of core assembly with coil assembly 11 encircling armature 12. Armature 12 therefore forms a common return for two magnetic loops or paths through core assembly 10.

A pair of shading coils 24 is affixed to core assembly 10 adjacent the ends 26 thereof and the air gaps 27 between ends 26 and armature 12. The shading coils 24 are positioned on opposite sides of the armature 12 and aid to maintain minimal air gaps 27 between ends 26 and the armature 12. Shading coils 24 may be fabricated from conventional good conducting substances. Shading coils 24 are adapted to damp alternating current oscillations between armature 12 and core assembly 10. The oscillations resulting from the use of the alternating current to energize the electromagnet normally cause the armature to pendulate between the ends 26 of core assembly 10. Introduction of shading coils 24 will virtually eliminate this pendulating action of armature 12. The size and exact position of shading coils 24 is determined by the amount and the type of shading or damping of oscillations required in the particular application.

Retaining bars 25 (shown in Fig. 2) of insulating material are positioned on the outer edges of the core assembly to prevent the armature from moving sidewise of core assembly 10.

Figure 3:
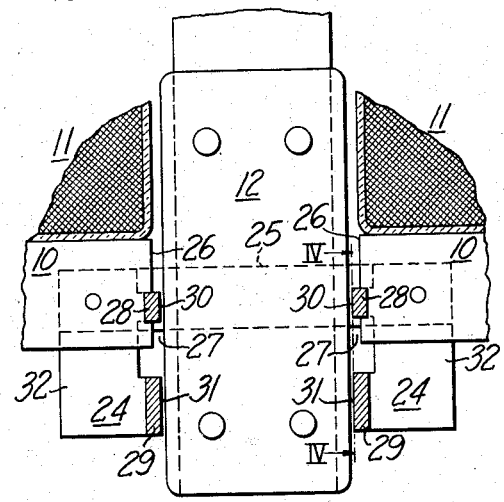
Fig. 3 is an enlarged fragmental section taken along line III—III of Fig. 1 showing the lower portion of the alternating current electromagnet illustrating the position of the shading coil relative to the armature in a deenergized position.
Figure 5:
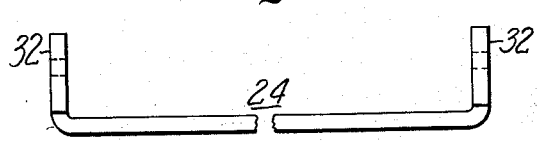
Fig. 5 is a plan view of the shading coil shown in Fig. 4.
Figures 4, 6:
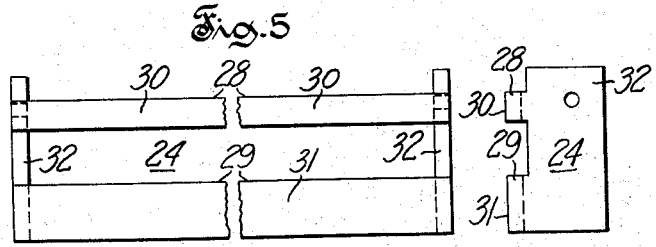
Fig. 4 is a view along line IV—IV of Fig. 3 showing an elevational view of the shading coil and bearing surfaces.
Fig. 6 is an end view of the shading coil shown in Fig. 4.

Fig. 3 illustrates more clearly, the relation of the shading coils 24 to the armature 12. The illustrative construction of the shading coil 24 as used in this embodiment is further illustrated in greater detail in Figs. 4 through 6. Each of the shading coils 24 has a first part 28 and a second part 29. The dimensions of first part 28 and the second part 29 are dimensionally dependent on the amount of shading required. However, as parts 28 and 29 together determine the amount of shading, second part 29 can be made wider than first part 28 when desired and if needed to provide sufficient bearing surface. Second part 29 can be positioned above or below first part 28 as desired and consonant with the design of the electromagnet.

First part 28 of good electrical conducting material presents a flat bearing surface 30, and second part 29 of good electrical conducting material presents a flat bearing surface 31. First part 28 may be positioned adjacent core assembly 10 as good shading design may require and is shown in this preferred embodiment as being partially embedded in end 26 of core assembly 10. Second part 29 is positioned immediately below first part 28 and without core assembly 10. First part 28 and second part 29 are joined together at their respective extremities by end plates 32 of good electrical conducting material which are affixed to the core assembly. End plates 32 which may be separate plates affixed to parts 28, 29 are shown in this embodiment as integrally formed with parts 28, 29 and structurally and electrically connecting second part 29 with first part 28, to provide a complete path or loop.

Bearing surfaces 30, 31 of each of the shading coils 24 are flat bearing surfaces capable of journaling the armature in its upward and downward motion as it is energized and deenergized, respectively.

In operation, as alternating current is passed through coil assembly 11 a magnetic field comprising two magnetic loops or paths is set up in core assembly 10 and across air gap 27 for energizing armature 12 which provides a common return for the magnetic loops. Energization of the core and coil assemblies 10, 11 therefore causes armature 12 to travel upward a distance ($d$) until it abuts surface 23 of core assembly 10. As armature 12 is energized shading coils 24 damp the alternating current oscillations between core assembly 10 and armature 12 and also furnish bearing surfaces 30, 31 to guide armature 12 in its upward travel. Deenergization of armature 12 causes it to fall due to gravitational force, or other suitable means for producing such force, not shown, if the electromagnet is not disposed upright. Its downward travel is stopped by plunger arms 18 which abut against core assembly 10. Bearing surfaces 30, 31 guide armature 12 in its downward travel.

The particular embodiment of the invention illustrated and described herein is illustrative only and the invention includes such other modifications and equivalents as may readily appear to those skilled in the art, within the scope of the appended claims.

It is claimed and desired to secure by Letters Patent:

1. In an alternating current electromagnet, the combination comprising: a C-shaped laminated core assembly, a coil assembly inductively coupled therewith, a movable armature disposed to be magnetically actuated by said coil assembly, said core and said armature providing plural magnetic paths, a shading coil in each of said magnetic paths, each said shading coil presenting a bearing surface to guide said armature in its movement as said armature responds to the energizing and deenergizing of said coil assembly.

2. In an alternating current electromagnet, the combination comprising: a C-shaped laminated core assembly, a coil assembly within said core assembly and inductively coupled therewith, a movable armature disposed between the termini of said core and extending through said coil assembly to be magnetically actuated by said coil assembly, a shading coil affixed to each of said termini of said core assembly and positioned adjacent said armature, each of said shading coils presenting a pair of bearing surfaces, each of said bearing surfaces guiding said armature in its reciprocating movement as said armature responds to the energizing and deenergizing of said coil assembly.

3. In an alternating current electromagnet, the combination comprising: a C-shaped laminated core assembly presenting ends, a coil assembly inductively coupled therewith, a movable armature disposed between said ends to be magnetically actuated by said coil assembly, a shading coil affixed to said core assembly on each of said ends and positioned adjacent said armature, each of said shading coils presenting a pair of bearing surfaces with one of said bearing surfaces being positioned between said ends of said core assembly and the other of said bearing surfaces being positioned in spaced relation to said ends of said core assembly, each of said bearing surfaces guiding said armature in its reciprocating movement as said armature responds to the energizing and deenergizing of said coil assembly.

4. In an alternating current electromagnet, the combination comprising: a C-shaped laminated core assembly presenting ends, a coil assembly inductively coupled with said core assembly, an armature reciprocably disposed within said core assembly intermediate said ends and adapted to be magnetically actuated by said coil and core assemblies, said armature extending the length of said core assembly, a pair of shading coils affixed to said core assembly adjacent said ends of said core assembly, said shading coils being adapted to damp alternating current oscillations between said armature and said core assembly, each of said shading coils having a first and a second part, each of said parts presenting a bearing surface to said armature, said first part being positioned between said ends of said core assembly adjacent said armature, end plates for structurally and electrically connecting said first part with said second part, said end plates being affixed to said core assembly, said second part being positioned in spaced relation to said ends of said core assembly and adjacent the length of said armature, said bearing surfaces maintaining said armature in spaced relation to said ends and guiding said armature on its longitudinal dimension in its upward and downward movement as said armature responds to the energizing and deenergizing of said coil assembly, said armature providing a common return for two magnetic loops through said C-shaped core assembly.

5. In an alternating current electromagnet, the combination comprising: a C-shaped laminated core assembly presenting ends, a coil assembly carried by and inductively coupled with said core assembly, an armature reciprocably disposed within said core assembly intermediate said ends and adapted to be magnetically actuated by said coil and core assemblies, said armature extending in full length of said core assembly, a pair of shading coils affixed to said core assembly adjacent said ends of said core assembly, said shading coils being adapted to damp alternating current oscillations between said armature and said core assembly, each of said shading coils having a first and a second part, each of said parts presenting a bearing surface to said armature and extending the length of said armature, each of said first parts being partially embedded in opposite ends of said ends of said core assembly, end plates for structurally and electrically connecting said first part with said second part, said end plates being affixed to said core assembly, said second part being positioned without said core assembly and adjacent the length of said armature, said bearing surfaces maintaining said armature in spaced relation to said ends defining air gaps therebetween and guiding said armature on its longitudinal dimension in its upward and downward movement as said armature responds to the energizing and deenergizing of said coil assembly, said armature providing a common return for two magnetic loops through said air gaps and said C-shaped core assembly.

6. In an alternating current electromagnet having core and coil assemblies providing two magnetic paths in which said core assembly has two ends spaced apart with an armature disposed therebetween to provide a common return completing said magnetic paths and reciprocated across said ends when said coil assembly is energized and deenergized, a shading coil disposed adjacent each of said ends on opposite sides of said armature and each of said coils being magnetically associated with one of said magnetic paths by encircling a part of one of said ends and constituting a surface guiding the movement of said armature.

References Cited in the file of this patent
UNITED STATES PATENTS

| 1,344,260 | Canfield | June 22, 1920 |
| 1,947,291 | Ford | Feb. 13, 1934 |
| 2,098,197 | Ray | Nov. 2, 1937 |
| 2,121,657 | Fisher | June 21, 1938 |

FOREIGN PATENTS

| 220,166 | Great Britain | Aug. 14, 1924 |